May 24, 1949.  W. A. LEDWITH  2,470,780
DIAPHRAGM SEAL FOR GAS TURBINES
Filed Aug. 23, 1944  2 Sheets-Sheet 1

INVENTOR
Walter A. Ledwith

May 24, 1949.  W. A. LEDWITH  2,470,780
DIAPHRAGM SEAL FOR GAS TURBINES
Filed Aug. 23, 1944  2 Sheets-Sheet 2

INVENTOR
Walter A. Ledwith

Patented May 24, 1949

2,470,780

UNITED STATES PATENT OFFICE 2,470,780

DIAPHRAGM SEAL FOR GAS TURBINES

Walter A. Ledwith, Hartford, Conn., assignor to United Aircraft Corporation, East Hartford, Conn., a corporation of Delaware Application August 23, 1944, Serial No. 550,890

5 Claims. (Cl. 60—41)

This invention relates to turbine rotors particularly adapted for use in turbines driven by hot gases.

The diaphragm seal which limits leakage of power fluid past the inner edge of the diaphragm at the inner edge of each row of nozzles is generally made as small as possible in diameter to reduce leakage. To accomplish this, the adjacent rows of blades on the turbine rotor are carried by disks between which the diaphragm extends, this diaphragm projecting inwardly from the row of nozzles and carrying a seal at its inner edge. The hot nozzles and diaphragm radiate heat to the rotor disks, a large area of each of which is exposed directly to such radiation. A feature of this invention is the arrangement of the diaphragm seal adjacent to the roots of the turbine blade to minimize the surface area of the rotor exposed to the hot gases.

The rotor may be built up of aligned disks which have interengaging flanges for holding them in predetermined relation. A feature of this invention is the radial spacing of the diaphragm seal from these interengaging flanges, thereby locating the seal close to the nozzles and also close to the blade roots.

The turbine rotor may be cooled internally and externally as shown in the copending Kalitinsky and Soderberg application, Serial No. 550,885, filed August 23, 1944, in which a cooling fluid is blown over the outer surfaces of the rotor disks from within the rotor. A feature of this invention is the arrangement of the diaphragm seal, a part of which guides the flow of fluid so that the cooling fluid is directed onto the outer surfaces of the disks adjacent the blade roots.

Other objects and advantages will be apparent from the specification and claims, and from the accompanying drawings which illustrate an embodiment of the invention.

Figure 1:
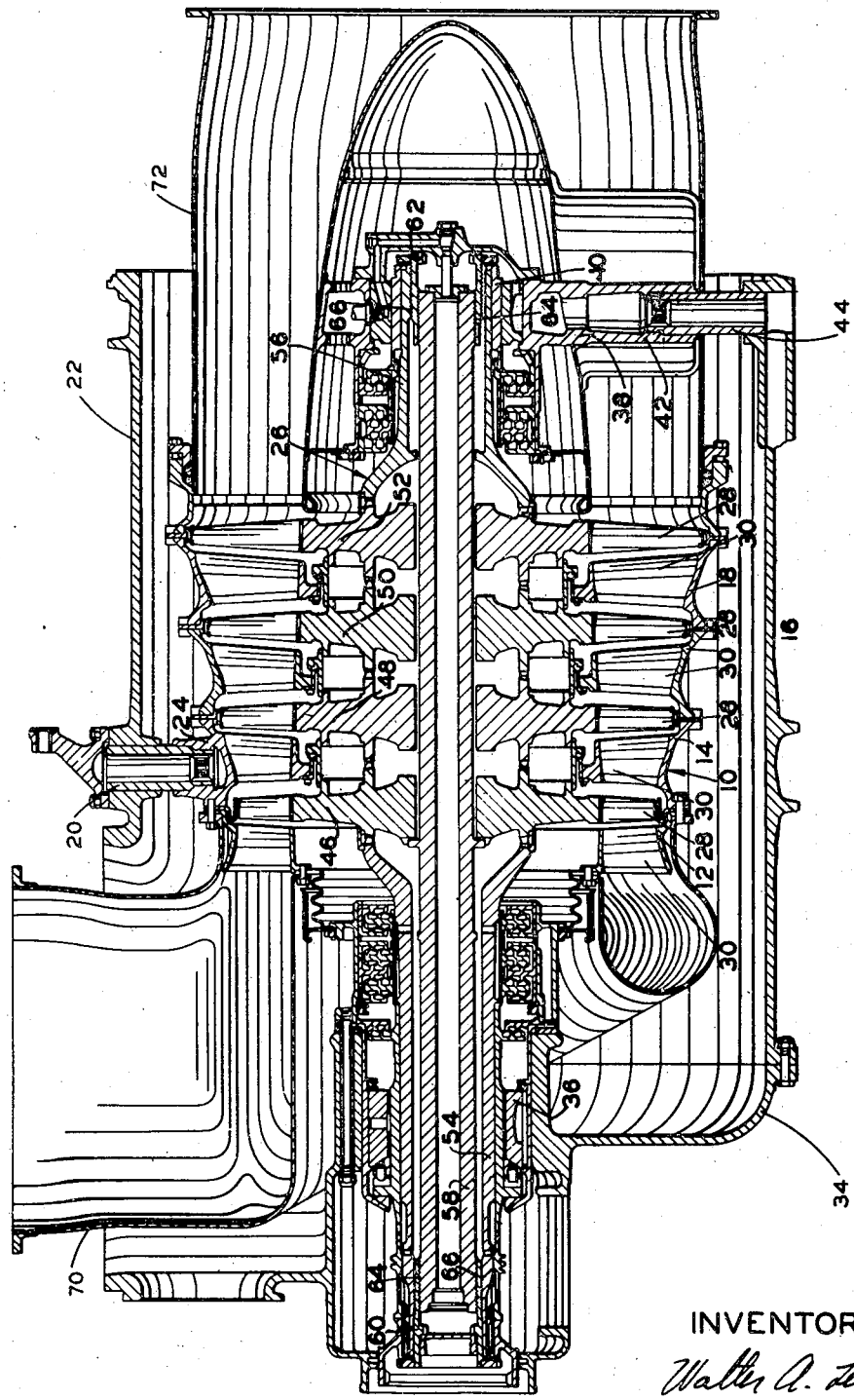
Fig. 1 is a sectional view through the turbine.

The turbine shown includes a casing 10 built up of rings 12, 14, 16 and 18 supported by radial pins 20 in a housing 22. These pins which are all in substantially the same plane and which constitute the support for the casing within the housing engage bores in bosses 24 in one ring 14 of the casing. Rotor 26 within the casing has rows of blades 28 alternating with rows of nozzles 30 in the casing.

Housing 22 has a head 34 which forms a part of the housing and supports a bearing sleeve 36 for the front end of the rotor. At the other end of the turbine, housing 22 supports a mounting 38 within which is a bearing 40 for the rotor. The mounting has a number of legs 42 engaging radial pins 44 in the housing.

Rotor 26 is made up of a number of disks 46, 48, 50 and 52, and shaft-forming end elements 54 and 56. The disks and the end elements are all held together by a central bolt 58, the ends of which are connected to the end elements by threaded sleeves 60 and 62. Each of sleeves 60 and 62 has inner and outer threads 64 and 66 engaging respectively with cooperating threads on the bolt and on the end elements. On one of the sleeves (sleeve 60) the inner and outer threads may differ in pitch so that a tension may be applied to the bolt as the sleeve is screwed into place.

Figure 2:
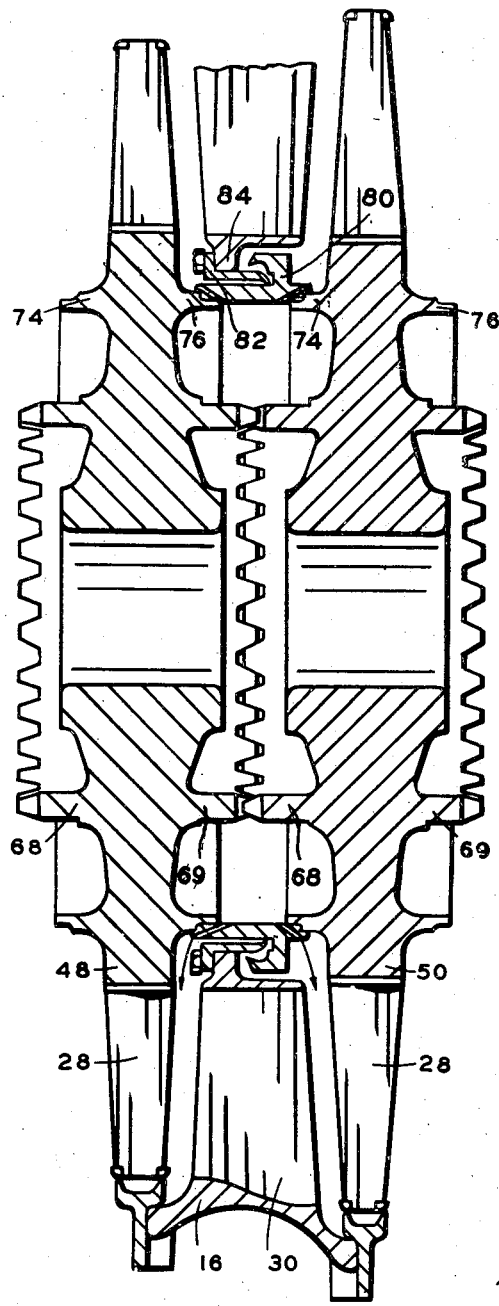
Fig. 2 is a fragmentary sectional view on a larger scale showing the arrangement of the diaphragm seal.

To assist in aligning the disks during assembly and to maintain alignment and concentrically in operation as well as to hold adjoining disks in predetermined spaced relation, each disk has radially projecting interengaging flanges 68 and 69, Fig. 2, on opposite sides which hold the disks in spaced relation. The inner ends of the shaft elements 54 and 56 engage with the flanges on the outer surfaces of the end disks.

Gas enters the first stage nozzles of the turbine through an inlet scroll 70 attached to the end of casing 10. Gas from the turbine discharges through a duct 72 connected to the end casing ring and surrounding the rear bearing mounting.

The diaphragm seal is located as close to the blade roots as possible to minimize the surface of the rotor exposed to the hot gas. As shown in Fig. 2 the rotor disks 48 and 50 have projecting flanges 74 and 76 spaced from flanges 68 and 69 and located close to the blade roots. The opposed flanges support a sleeve 78 on which is formed one element 80 of the diaphragm seal. Cooperating with element 80 is the ring 82 forming the other seal element which is mounted on a flange 84 on the inner periphery of the row of nozzles 30 on casing ring 16. By this arrangement only a small area of the rotor disks is exposed to the hot gases and less heat will be absorbed by the rotor.

As disclosed in the copending Kalitinsky and Soderberg application, Serial No. 550,885, above referred to, cooling air is admitted to the interior of the rotor and escapes past the flanges 68 and 69. The sleeve 78 may have passages 86 which permit the cooling air to escape and which direct this cooling air over the exposed surfaces of the disks as shown by the arrows in Fig. 2. In this way the cooling air passes directly over the hottest parts of the disks and assists in preventing excessive heating of the rotor.

It is to be understood that the invention is not limited to the specific embodiment herein illustrated and described, but may be used in other ways without departure from its spirit as defined by the following claims.

I claim:

1. A turbine rotor including blade carrying disks having spacing means therebetween for holding said discs in predetermined spaced relation and concentric to one another, said discs also having laterally projecting flanges adjacent the blade roots and spaced radially outward from said spacing means, and a diaphragm seal supported by said flanges, said seal extending between the discs and having passages for the escape of cooling air from within the rotor.

2. A turbine rotor including blade carrying disks having spacing means therebetween for holding said discs in predetermined spaced relation and concentric to one another, said discs also having laterally projecting flanges adjacent the blade roots and spaced radially outward from said spacing means, and a diaphragm seal supported by said flanges, said seal having passages for the escape of cooling air from within the rotor, said seal and passages being arranged to guide the cooling air against the surfaces of the disks.

3. A turbine rotor including blade carrying disks having spacing means therebetween for holding said discs in predetermined spaced relation and concentric to one another, said discs also having a seal in the form of a ring extending between and engaging adjacent disks, and axially extending projections on the disks adjacent to the blade roots for supporting the seal, said seal providing passages for the escape of cooling air from within the rotor.

4. A turbine rotor including blade carrying discs, structural elements extending between said discs for supporting the discs in predetermined spaced relation and in concentric relation, a seal in the form of a ring extending between and engaging adjacent discs, and axially extending projections on the disc spaced radially outward of the structural elements and adjacent to the blade roots for supporting the seal, said seal having passages therethrough and arranged in such a direction as to direct air escaping through said passages from within the rotor against the side surfaces of the discs.

5. A turbine including a rotor having blade carrying discs each having substantially cylindrical flanges on opposite surfaces thereof, said flanges having their end surfaces in engagement for locating the discs with respect to one another, and other flanges on said discs between said first flanges and the blades, said other flanges being out of engagement with each other to leave a space therebetween, in combination with a diaphragm seal in the form of a ring engaging with and supported by said other flanges in spaced relation to said first flanges and a casing having a row of nozzles located between adjacent discs and carrying an inwardly extending diaphragm, the inner edge of which engages said diaphragm seal.

WALTER A. LEDWITH.

REFERENCES CITED

The following references are of record in the file of this patent:

UNITED STATES PATENTS

| Number | Name | Date |
|---|---|---|
| 2,080,425 | Lysholm | May 18, 1937 |
| 2,213,940 | Jendrassik | Sept. 3, 1940 |
| 2,369,051 | Huber | Feb. 6, 1945 |

FOREIGN PATENTS

| Number | Country | Date |
|---|---|---|
| 352,282 | Germany | Apr. 24, 1922 |
| 218,177 | Switzerland | Mar. 2, 1942 |